United States Patent [19]
Hicok et al.

[11] Patent Number: 5,835,104
[45] Date of Patent: Nov. 10, 1998

[54] VARIABLE BAND SIZE COMPOSITING BUFFER METHOD AND APPARATUS

[75] Inventors: Gary D. Hicok; Jeffery M. Michelsen, both of Mesa, Ariz.

[73] Assignee: S3 Incorporated, Santa Clara, Calif.

[21] Appl. No.: 841,360

[22] Filed: Apr. 23, 1997

[51] Int. Cl.⁶ .................................................. G09G 5/36
[52] U.S. Cl. .......................... 345/509; 345/516; 345/524
[58] Field of Search .................. 345/507–509, 345/515, 516, 523–525, 501

[56] References Cited

U.S. PATENT DOCUMENTS

| | | | |
|---|---|---|---|
| 3,357,579 | 12/1967 | Buchner et al. | 382/1 |
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,965,751 | 10/1990 | Thayer et al. | 364/521 |

(List continued on next page.)

FOREIGN PATENT DOCUMENTS

WO 96/36011  11/1996  WIPO.

OTHER PUBLICATIONS

Proceedings of the Siggraph '96 Conference on Computer Graphics, "Talisman : Commodity Reat Time 3D Graphics for the PC" by J. Torborg et al. pp. 353–363, Aug. 4–9, 1996.

Aharonian, Greg, Patnews: Silicon Graphics and Lockheed Battling Over Software Patents, pp. 1–6, Internet Patent News Service, Jan. 16, 1997.

Torborg, J., et al., Talisman: Commodity Realtime 3D Graphics for the PC, pp. 1–10, Microsoft Corporation, 1996.

Talisman Multimedia System, Microsoft Corporation, Jun. 1996.

Torborg, J., et al., Talisman: Commodity Realtime 3D Graphics for the PC, "Polygon Object Processor", Microsoft Corporation, Siggraph final doc from Internet, Mar. 1997.

Glaskowsky, P., Analyst, "Microsoft's Talisman", MicroDesign Resources, 1997.

*Primary Examiner*—Kee M. Tung
*Attorney, Agent, or Firm*—Fenwick & West LLP

[57] ABSTRACT

A compositing buffer having an adjustable size and configuration reduces complexity and size of a multimedia processor integrated circuit. The compositing buffer may be optimized for lower resolutions, thus reducing its overall size and complexity, while still providing support for higher resolutions which may be required to support a particular standard. A pixel mapping logic receives data indicating the number of lines per band and number of pixels per line, as well as color depth (or any two of these data) and correctly maps compositing RAM bank access requests to the correct pixel location. In a second embodiment of the present invention, the variable band size of the compositing buffer may allow for an external memory to be used for a compositing buffer, for example, a portion of the display memory (frame buffer). While such an embodiment may reduce overall bandwidth, the associated cost reduction may make such an apparatus appealing for low cost applications. Band size may be adjusted depending upon pixel resolution and depth. In a third embodiment of the present invention, band size may be varied within a frame depending upon the number of layers or the complexity of each image portion. Simple portions of an image, have few layers, may be rendered using wide bands, whereas complex areas may be rendered in narrower bands.

20 Claims, 8 Drawing Sheets

U.S. PATENT DOCUMENTS

| | | | |
|---|---|---|---|
| 4,974,176 | 11/1990 | Buchner et al. | 364/522 |
| 5,058,041 | 10/1991 | Rose et al. | 345/501 |
| 5,126,726 | 6/1992 | Howard et al. | 340/728 |
| 5,185,856 | 2/1993 | Alcorn et al. | 395/130 |
| 5,187,754 | 2/1993 | Currin et al. | 382/54 |
| 5,191,642 | 3/1993 | Quick et al. | 395/127 |
| 5,230,039 | 7/1993 | Grossman et al. | 395/130 |
| 5,266,941 | 11/1993 | Akeley et al. | 345/201 |
| 5,268,996 | 12/1993 | Steiner et al. | 395/126 |
| 5,293,467 | 3/1994 | Buchner et al. | 395/122 |
| 5,329,616 | 7/1994 | Silverbrook | 395/164 |
| 5,329,617 | 7/1994 | Asal | 395/166 |
| 5,367,615 | 11/1994 | Economy et al. | 395/129 |
| 5,388,206 | 2/1995 | Poulton et al. | 345/505 |
| 5,420,970 | 5/1995 | Steiner et al. | 395/133 |

VARIABLE BAND SIZE COMPOSITING BUFFER METHOD AND APPARATUS

CROSS-REFERENCE TO RELATED APPLICATIONS

The subject matter of the present application is related to that in co-pending U.S. patent applications Ser. No. 856,118 filed (May 14, 1997) entitled "PROGRAMMABLE FOUR-TAP TEXTURE FILTER", and Ser. No. 890,825 filed (Jul. 10, 1997) entitled "VIRTUAL MEMORY MANAGER FOR MULTI-MEDIA ENGINES".

FIELD OF THE INVENTION

The present invention is related to the field of multi-media integrated-circuit controllers for use with computer systems. In particular, the present invention is directed toward the use of compositing buffers in such multi-media controllers.

BACKGROUND OF THE INVENTION

Prior art computer systems generally employed a graphics controller (e.g., VGA, SGVA, or the like) such as illustrated in FIG. 1. FIG. 1 is a block diagram illustrating major components of a computer system 100 provided with display controller 120 (e.g., Video Graphics Adapter (VGA), Super VGA (SVGA) or the like). Display controller 120 may generate pixel data for display 180 (e.g., CRT, flat panel display or the like) at a rate characteristic of the refresh rate of display 180 (e.g., 60 Hz, 72 Hz, 75Hz, or the like) and horizontal and vertical resolution of a display image (e.g., 640×480 pixels, 1024×768 pixels, 800×600 pixels or the like). A continuous stream of pixel data may be generated by display controller 120 at the characteristic rate of display 180.

Display controller 120 may be provided with a display memory 130 which may store and entire frame of pixel data in text, graphics, or video modes for output to display 180. Host CPU 110 may be coupled to display controller 120 through bus 150 and may update the contents of display memory 130 when a display image for display 180 is to be altered. Bus 150 may comprise, for example, a PCI bus or the like. System memory 160 may be provided coupled to Host CPU 110 for storing data.

Hardware MPEG decoder 140 may be provided to decode MPEG video data from an MPEG video data source (e.g., CD-ROM or the like) and output decoded video data to system memory 160 or directly to display memory 130. However, with the advent of increasingly powerful and faster microprocessors (e.g., Pentium™ or PowerPC™ processor or the like) it may be possible to implement MPEG decoding (or the like) entirely within software operating within host CPU 110.

However, in recent years, the popularity of "multi-media" devices for computers has become popular. Multi-media, as the name implies, encompasses a number of different types of functions, such as 2-D and 3-D graphics, animation, Full Motion Video™, audio, and the like. Such devices may be used for games or for business use (e.g., teleconferencing).

Unfortunately, implementation of multi-media technology has been hampered by the lack of any coherent standard for various discreet multi-media devices (graphics controllers, CD-ROM or DVD controllers, sound cards, modems, and the like). As a result, a user may become frustrated to discover that different devices conflict with one another or will not work within his or her system.

Some attempts have been made to provide better compatabilty between multimedia devices. For example, Microsoft® has promoted the use of Plug and Play™ technology. Plug and Play™ is a standard by which various peripheral devices may be inserted into a computer system which will automatically configure the system and resolve any device conflicts.

However, even with such systems, other drawbacks are present. For example, to provide realistic three dimensional (3-D) imaging, considerable processor power may be required. Users may be reluctant to discard existing personal computer (PCs) in order to take advantage of new 3-D software.

FIG. 2 is a block diagram of one apparatus which attempts to solve this problem. The apparatus of FIG. 2 is described in more detail in *Talisman: Commodity Realtime 3D Graphics for the PC* by Jay Torborg and James T. Kajiya (Microsoft Corporation, Aug. 21, 1996) incorporated herein by reference. In FIG. 2, a single multi-media device may be provided as a plug-in card for a PC. The multi-media device may be provided with a media signal processor (MSP) 210 coupled to a system bus 200 such as a Peripheral Communications Interface (PCI) or the like.

Media I/O device 230, providing an interface for joysticks or the like ( e.g., USB 1344 or the like) may be provided coupled to MSP 210, along with Audio CODEC (audio modem) 240. Polygon Object Processor 250 may render 3-D images of polygons. Image layer compositor 260 may combine a number of image layers or elements using a compositing buffer to generate an output image.

Graphics memory 270 may comprise a RDRAM or other high-speed memory. Video output may pass through COMP/DAC 280 (e.g., decompressor, RAMDAC, and the like) for color conversion and output to a display.

One disadvantage of the design of FIG. 2 is that each of the various chips may have intensive processing requirements. Graphics rendering chips 250 and 260 may have as many gates as a Pentium™ and Pentium™ PRO™ processor, respectively. Thus, the device of FIG. 2 may be relatively complex and expensive. Moreover, the many of the functions served by the apparatus of FIG. 2 may be able to be performed using more advanced host microprocessors, such as the Intel® MMX™ processor or its progeny and successors.

FIG. 3 is a block diagram of another approach to an improved multi-media controller. In the apparatus of FIG. 3, an advanced microprocessor communicates with a multimedia controller 310 over an Accelerated Graphics Port (AGP) 300 which may be a PCI-like type communications bus provided with specialized and enhanced communications features. Multimedia controller 310 incorporates may of the functions of the elements of the apparatus of FIG. 2 and in addition may rely upon an enhanced host processor to perform come multi-media functions. Multi-media controller 310 may be coupled to RDRAM 320 which may be used to store image data.

The apparatus of FIG. 3 has the advantage of being able to interface with newer processor designs. However, the apparatus of FIG. 2 may be more suitable as an upgrade to existing computers. In either design, however, the size of the semiconductor devices may become unwieldy and cost prohibitive due to the complexity of the designs and the functions to be performed. Thus, it remains a requirement in the art to provide a multi-media controller which preforms required multi-media functions with a minimal number of gates.

Referring back to FIG. 1, in the prior art, a display controller may operate as follows. Host CPU 110 or MPEG decoder 140 may generate graphics or other display data and store such data in display memory 130 through display controller 120. Display controller 120 may then output display data from display memory 130 at a rate characteristic of the refresh rate of CRT (or other display) 180.

Thus, display controller 120 and display memory 130 acts as a full frame buffer, storing an entire frame of display data, and acting as an intermediary between the image updating rate of the CPU 110 or MPEG decoder 140 and the characteristic refresh rate of CRT (or other display) 180.

One problem encountered using such a full frame buffer as display memory 130 is a phenomena known as frame latency. This phenomena may be readily apparent in computer games, or even when moving a computer mouse in a graphical user interface (GUI) program. Display controller 120 may generate output data on a frame-by-frame basis. Thus, there may be a latency of one frame (or more) between the time an object moves in real-time versus displayed movement on the screen.

In most programs, such a delay is acceptable. However, for high speed computer games, simulations, and the like, such a delay may make the game (or simulation) appear artificial and reduce the feedback between user input and display.

To reduce frame latency and memory bandwidth requirements, the apparatus of FIG. 2 proposes using a compositing buffer to generate output display data on a band-by-band basis. A compositing buffer may generate data for a number of lines of output data at a very high speed in order to generate display data in real time (e.g., at a rate corresponding to the refresh rate of CRT or other display 180).

Various elements of a 3-D display image may be stored in RDRAM 260. Each element may represent a different layer or portion of an image. For example, a background image may represent an overall background screen. Other elements may then be overlayed over this background much in the same way that cartoon "cells" are combined to form an image. Altering perspective, size, or rendering of an object may provide the appearance of 3-D animation. In addition, other techniques, such as texture mapping, may be used to give surfaces of polygon objects a realistic appearance.

Compositing buffer 260 may combine these elements to produce a band of display data, where each band represents a number of lines from a frame. As a video display displays data on a rasterized basis, such bands may be sequentially generated and output without interrupting the flow of data to a display device. The use of a compositing buffer obviates the need for full frame buffering of a video image, thus reducing memory requirements, memory bandwidth requirements, and frame latency.

However, the apparatus of FIG. 2 contemplates a fixed compositing buffer of 32 lines, having 1344 pixels per line, with a pixel depth of at least 24 bits per pixel (bpp). Such a high horizontal resolution is desired to support future higher resolution displays. In particular, it is envisioned that displays of 1344 by 1024 may be implemented to provide an image having an aspect ratio of 4:3 (as compared to the typical PC ratio of 5:4). A 4:3 ratio may be more compatible with other entertainment formats (e.g., HDTV and the like).

FIG. 5 is a block diagram illustrating compositing buffer 501 which may reside within image layer compositor 260 of FIG. 2. Compositing buffer 501 may be fed with five bits of line address data, line[4:0], from a total of eleven bits of line address data, line[10:0]. Eleven bits of line address data, line[10:0] may provide $2^{11}$ or 2048 available line addresses, sufficient for a 1024 by 1344 display. Five bits of line address data, line[4:0] may provide $2^5$ or 32 total line addresses, for a band of 32 lines. Eleven bits of pixel data may provide for $2^{11}$ of 2048 total pixel addresses within a line, sufficient for a horizontal resolution of 1344 pixels.

Color data represented by color[23:0] may be stored in, or read out from compositing RAM bank 501. Color data color[23:0] may comprise 24 bits per pixel (bpp), as illustrated in FIG. 5, or may be expanded to 32 bpp.

When compositing a band of image data, various elements for an image may be assembled as is known in the graphics arts. A band of background image information may be written to compositing RAM bank 501 and other image information representing foreground objects may be written over that background image information. So-called transparency values may be used to determine how to combine foreground and background image information to produce a completed image band. Once the band has been composited, the data may then be read out to a display or the like. Note that for the purposes of illustration, a single port compositing RAM bank 501 is illustrated, whereas in actual practice, a multi-port (e.g., four port) device may be used to increase bandwidth.

Compositing RAM bank 501 is provided with a fixed resolution of 1344 pixels per line, and 32 lines per band, at a color depth of 24 bits per pixel (bpp), as per the specification of the system of FIG. 2. Thus, compositing RAM bank 501 may comprise a memory of 1344×32 addresses (43008 addresses) of 24 bits each, or the equivalent of approximately 130 KBytes of memory on-chip, a fairly substantial compositing buffer for on-chip applications. When using lower resolutions, many of the addresses and/or bytes compositing RAM bank 501 may remain unused. For example, when operating at 640×480 pixel resolution, at 8 bpp, less than one-third of compositing RAM bank 501 may be used to store valid data.

FIG. 4 is a graph illustrating estimated actual usage of various resolution levels along with future trends. In FIG. 4, the horizontal axis represents vertical resolution, whereas the vertical axis represents usage. The actual curve in FIG. 4 is an approximation of where the inventors believe the market presently resides. Most graphics applications typically use lower resolutions (e.g., 320×240) for games and the like. Only a few applications have yet to take advantage of the highest resolutions available.

As indicated by the arrow in FIG. 4, as time progresses, the general trend may be toward higher resolutions. However, for some foreseeable time to come, many 3-D applications will not be able to take advantage of the higher resolutions provided by the apparatus of FIG. 2. One reason for this trend is that games and the like depend upon motion for effect, rather than actual resolution or accuracy in rendering. Thus, a game designer may sacrifice detail for speed or action. Moreover, the human eye is more perceptive to color depth than resolution in many instances. Thus, a 640×480 image in 256 colors may appear much more realistic and lifelike than a 1024×768 image in 16 colors.

Referring back to FIG. 5, when considered in view of FIG. 4, it is readily apparent that a large portion of the capacity of compositing buffer 501 may be underutilized under most common graphics applications. Thus, compositing buffer 501 may be unnecessarily large and complex for most applications.

SUMMARY OF THE INVENTION

The present invention reduces the complexity and size of a multimedia processor integrated circuit by providing a compositing buffer having an adjustable size and configuration. The compositing buffer may be optimized for lower resolutions, thus reducing its overall size and complexity, while still providing support for higher resolutions which may be required to support a particular standard.

A pixel mapping logic receives data indicating the number of lines per band and number of pixels per line, as well as color depth (or any two of these data) and correctly maps compositing RAM bank access requests to the correct pixel location.

In a second embodiment of the present invention, the variable band size of the compositing buffer may allow for an external memory to be used for a compositing buffer, for example, a portion of the display memory (frame buffer). While such an embodiment may reduce overall bandwidth, the associated cost reduction may make such an apparatus appealing for low cost applications.

Band size may be adjusted depending upon pixel resolution and depth. In a third embodiment of the present invention, band size may be varied within a frame depending upon the number of layers or the complexity of each image portion. Simple portions of an image, have few layers, may be rendered using wide bands, whereas complex areas may be rendered in narrower bands.

DETAILED DESCRIPTION OF THE INVENTION

Figure 5:
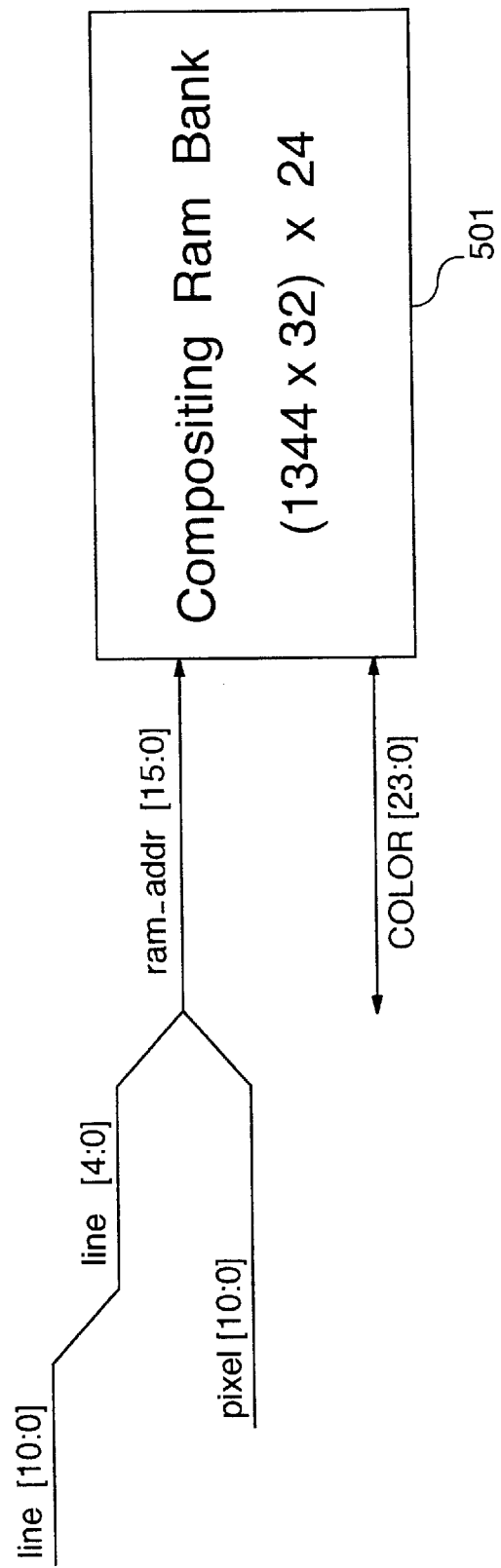
FIG. 5 is a block diagram illustrating a compositing buffer which may reside within the image layer compositor of FIG. 2.
Figure 6:
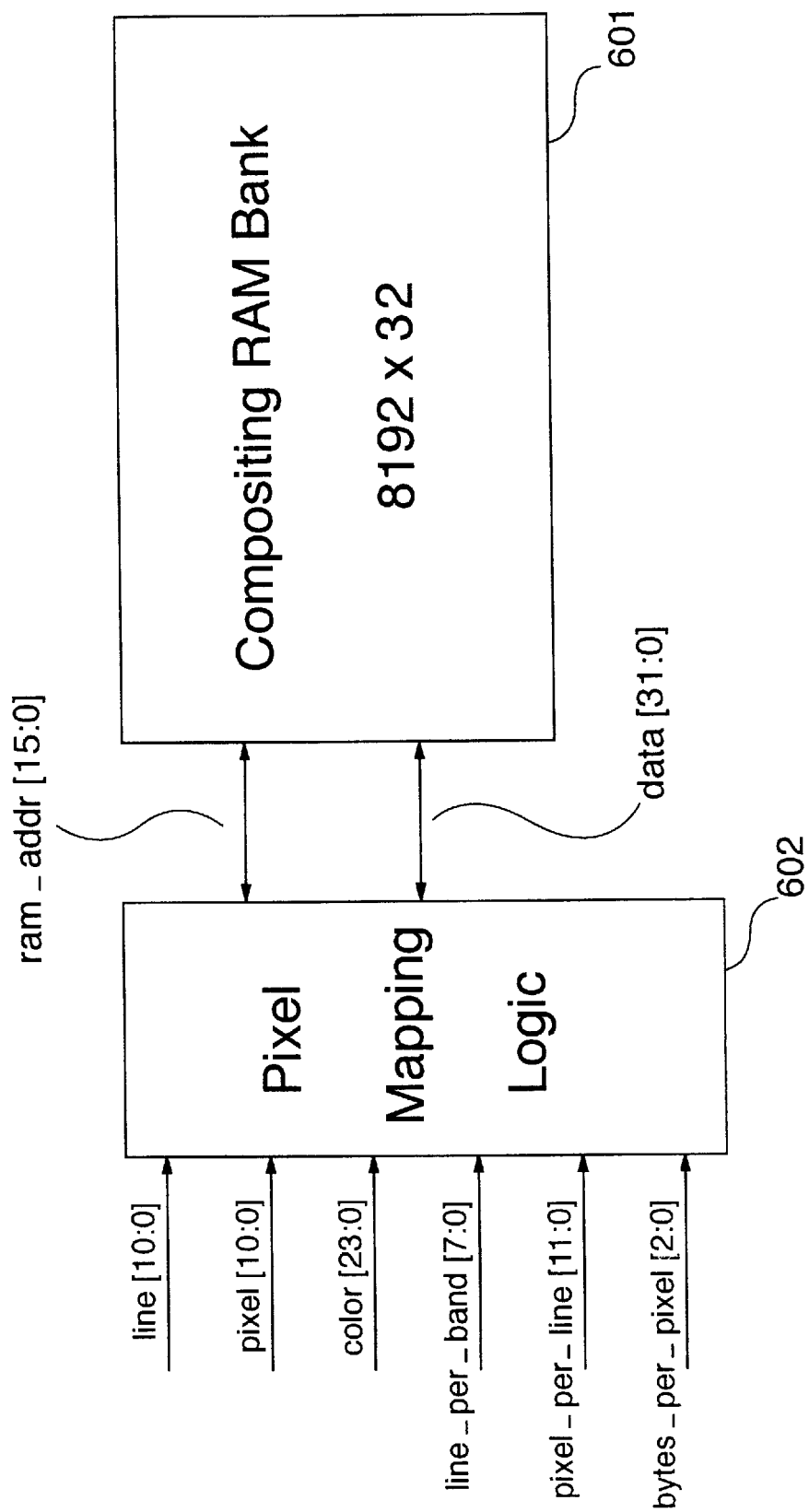
FIG. 6 is a block diagram illustrating the configurable compositing buffer of the present invention.

FIG. 6 illustrates the preferred embodiment of the present invention. In FIG. 6, compositing buffer (RAM BANK) 601 may comprise a memory (DRAM, SRAM, SGRAM, RDRAM or the like) formed within an image layer compositor such as image layer compositor 260 of FIG. 2. However, unlike compositing buffer 501 of FIG. 5, compositing buffer 601 may be much smaller in size.

In the example of FIG. 6, compositing buffer 601 may comprise a memory having 8192 addresses, with each address containing one double word (32 bits), or the equivalent of 32 Kbytes of memory, or almost one-fourth the size of the compositing buffer of FIG. 5. Placing large memories on ASIC chips presents many problems from a design and manufacturing standpoint. Memories may take up a large proportion of chips space, leaving little space for a designer to insert logic circuitry. In addition, such memories raise gate count, thus increasing the complexity of the design.

Moreover, the use of large memories in a custom ASIC may reduce chip yield, thus driving up component cost. If a defect is produced in the memory portion of the ASIC, the entire ASIC may need to be scrapped. Thus, reducing the overall size of on-chip memory may increase overall chip yields.

Compositing RAM bank 601 may be reconfigured for different band sizes by pixel mapping logic 602. Pixel mapping logic receives as inputs line[10:0] and pixel[10:0] indicating the location of a pixel within a band. Actual band size may be determined by the resolution (horizontal, vertical, depth) of a display. Software operating within media signal processor 210, for example, may determine optimal band size depending upon screen resolution.

For example, a display of 1024 by 768 pixels may be broken up into bands of 16 lines, resulting in 48 bands needed per screen. For a color depth of 16 bits per pixel (bpp) (i.e., two bytes per pixel), a total of 1024 (pixels/line) ×16 (lines per band)×2 (bytes per pixel) or 32 KBytes of memory would be required. However, if pixel depth were increased to 24 bpp, additional memory would be needed.

Instead, in the present invention, band size is decreased to 10 lines per band. In some instances, this may result in a performance trade-off. However, as noted above, as most applications may run at lower resolutions, such a trade-off may be acceptable to provide high performance 3-D graphics for games and the like at an acceptable product cost.

For a 640 by 480 display at 24 bpp resolution, compositing buffer 601 could be operated at 16 lines per band. As seen by these examples, the apparatus and method of the present invention allows for the optimum compositing buffer size to be selected for "typical" display resolutions while still supporting higher resolutions and higher color depths using fewer lines per band.

Media signal processor 210 or a host processor may determine band size from a look-up table or the like and output to pixel mapping logic 602 parameters to allow pixel mapping logic to configure compositing buffer 601 to a particular size. Alternately, pixel mapping logic 602 may receive resolution data directly (horizontal, vertical, depth) and determine compositing buffer band size from internal logic.

In the example of FIG. 6, three parameters are illustrated, although any two of these parameters may be used to infer the third, if overall compositing buffer size is known. Signal lines_per_band[7:0] may comprise seven bits indicating the number of lines per band (e.g., 0 to 256). The eight bits of signal lines_per_band[7:0] may generate $2^7$ or 256 combinations.

To reduce the number of bits required for signal lines_per_band, a base value of eight (or another number) may be added to a 3-bit signal lines_per_band to generate a range from 8 to 16. Other numbers of bits or band size ranges may be used without departing from the spirit and scope of the present invention. In the preferred embodiment, band size may generally be selected from one of a number of preferred sizes (e.g., 8, 10, 16, 24, 32, or the like). Thus, the number of bits to indicate lines_per_band may be reduced.

Signal pixel_per_line[11:0] comprises twelve bits indicating the number of pixels within each line. The twelve bits provide $2^{12}$ or 8192 combinations. Again, the number of bits in signal pixel_per_line[11:0] may be reduced accordingly to select from one of a number of limited resolution sizes (e.g., 320, 640, 800, 1024, 1344, or the like).

Signal bytes_per_pixel[2:0] may provide three bits ($2^3$ or 8 combinations) representing the number of bytes of color depth (e.g., one, two, three, or four bytes). Again, the number of bits for signal bytes_per_pixel may be reduced, for example, to two bits, to represent the four most commonly available color depths.

If memory size (memsize) is known, pixel mapping logic 602 can infer any of the three parameters lines_per_band, pixel_per_line, and bytes_per_pixel from any of the two. In general the following relationship between these three parameters will be true:

$$\text{lines\_per\_band} \times \text{pixel\_per\_line} \times \text{bytes\_per\_pixel} \leq \text{memsize}$$

Figure 7:
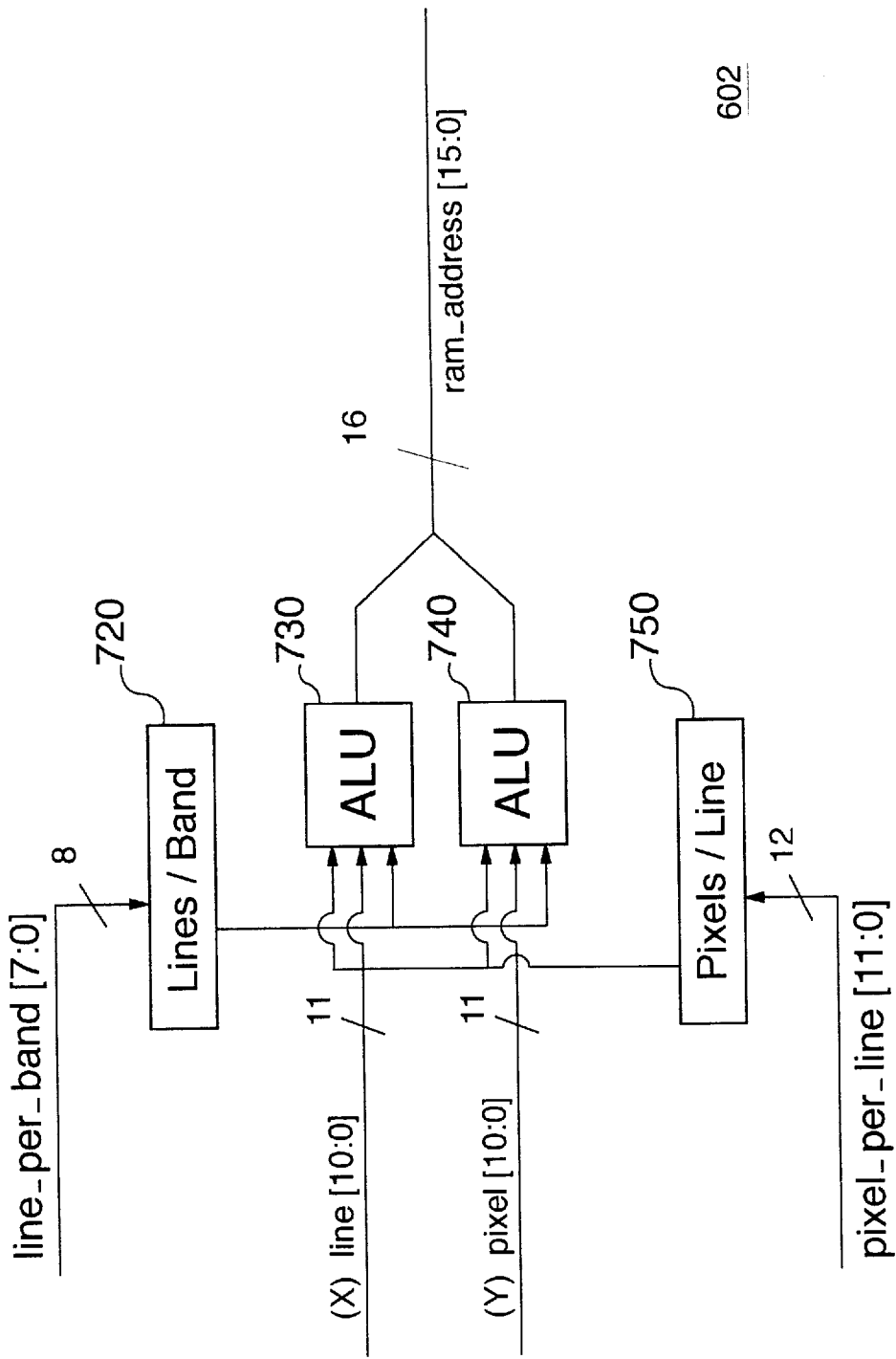
FIG. 7 is a block diagram illustrating the operation of pixel mapping logic 602 of FIG. 6.

FIG. 7 is a block diagram illustrating the operation of pixel mapping logic 602 of FIG. 6. In the Example of FIG. 7, two parameters line_per_band[7:0] and pixel_per_line [11:0] are used to translate line[10:0] address and pixel [10:0] address into a compositing buffer ram_address[15:0]. Signal lines_per_band[7:0] may be stored in register 720. Signal pixel_per_line[11:0] may be stored in register 750.

Signals from registers 720 and 70 may be combined with line[10:0] address in arithmetic logic unit (ALU) 730 to generate a portion of compositing bank address $\text{ram}_{13}$ address[15:0]. Signals from registers 720 and 70 may also be combined with pixel[10:0] address in arithmetic logic unit (ALU) 740 to generate a second portion of compositing bank address ram_address[15:0]. Together, ram_address [15:0] is formed.

When an access is to be made to compositing bank 601 (e.g. read or write), line and pixel addresses line[10:0] and pixel[10:0] are input to pixel mapping logic 602. Pixel mapping logic 602 then takes line and pixel addresses line[10:0] and pixel[10:0] and using suitable logic and two of line_per_band[7:0], pixel_per_line[11:0], and bytes per_pixel[2:0], outputs ram_address[15:0]. Data[31:0] representing 32 bits of data is then output from compositing buffer 601.

Signal color[23:0] may represent pixel data at 24 bpp or less. Thus, individual pixel data may be stored in more than one address, or alternately, more than one pixel may be stored within an address of compositing buffer 601, as is known in the art. Data may be combined or selected from 32 bits of data[31:0] to output selected pixel data color[23:0] corresponding to a given input line[10:0] and pixel[10:0] address.

Note that in the example of FIG. 7, signals line_per_ band[7:0] and pixel_per_line[11:0] are utilized to convert line[10:0] and pixel[10:0] address information into ram_ address[15:0]. However, as discussed above, similar conversion may be achieved by using any two of lines_per_ band[7:0], pixel_per_line[11:0], and bytes_per_pixel [2:0] if memory size is known. Thus, the illustration of FIG. 7 is by way of example only and is not intended to limit the scope of the present invention.

As illustrated in FIGS. 6 and 7, the present invention provides support for compositing while using a much smaller buffer than the design of FIG. 5. In addition to reducing buffer size, the present invention may provide other advantages as well. As noted above, an ASIC with built-in memory components may have lower yields as an ASIC may be discarded if any portion of the memory component is defective.

In the prior art, one partial solution to this problem would be to offer the ASIC with a defective memory as a separate product for use with an external memory. For example, the venerable 8052 controller ASIC is also offered as the 8032 controller without internal memory. The memory may still be present, however, due to defects in the memory, it may not be enabled. An external memory may be coupled to the ASIC in order to operate the device.

Figure 8:
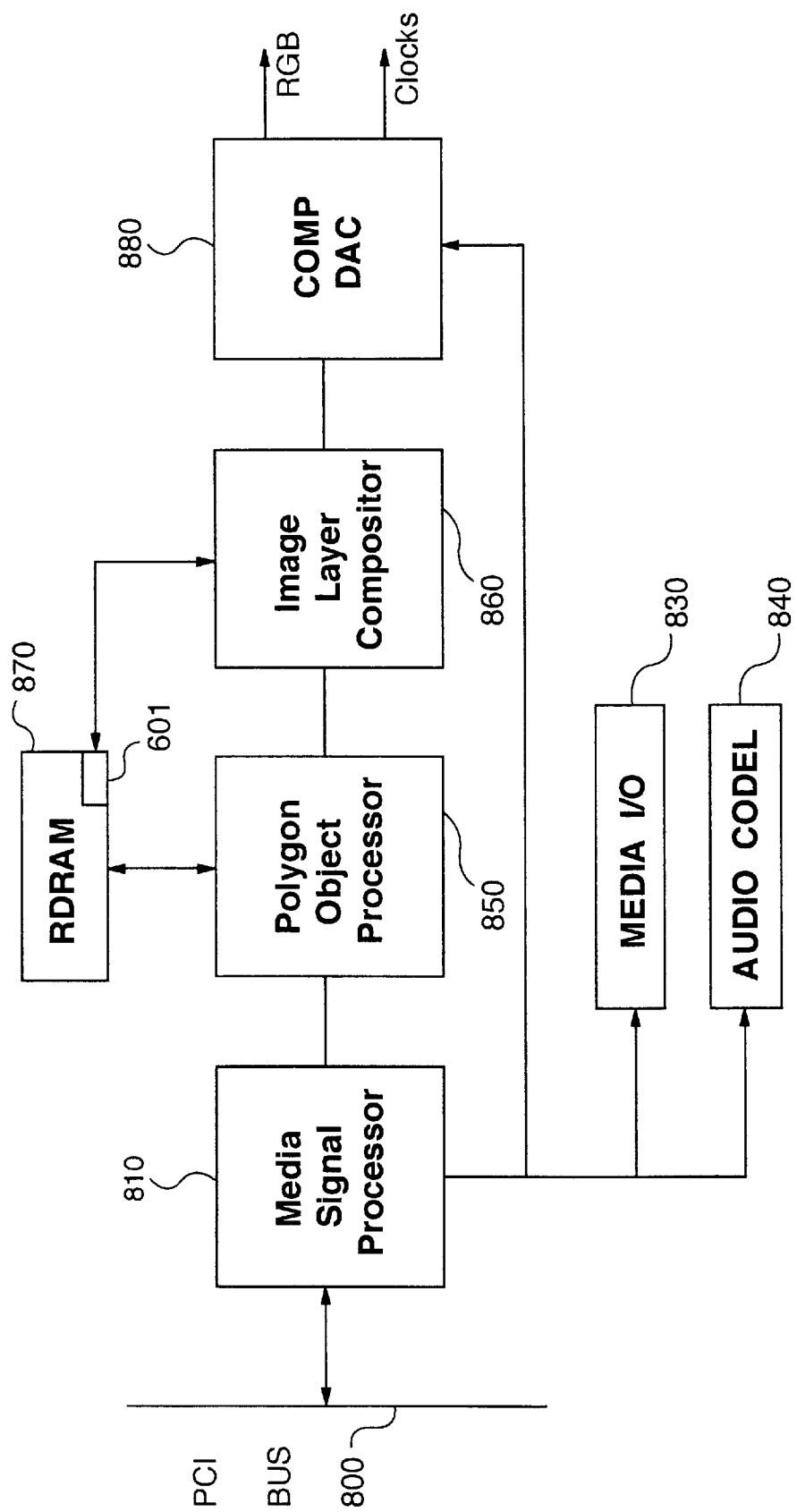
FIG. 8 is a block diagram of a second embodiment of the present invention where a compositing buffer may be provided as a portion of display memory.

Similarly, an image layer compositor may be offered with no compositing buffer built-in (either by design, or due to process defect) for use with an external compositing buffer. As the variable band size compositing buffer of the present invention is much smaller in size that the fixed compositing buffer of the prior art, it may be possible to implement a variable band size compositing buffer in display memory, for example RDRAM 870 of FIG. 8.

Image layer compositor 860 may be configured to access a selected portion of off-screen memory of RDRAM 870 which may be designated as compositing buffer 601. One possible disadvantage of such a scenario is that overall bandwidth of the resultant external compositing buffer may be reduced. However, with memory speeds ever increasing, performance degradation may be negligible or non-existent.

Moreover, such performance trade-offs may be desirable to make a compositing scheme workable and affordable. One criticism of the apparatus of FIG. 2, has been that the design is optimized from a software standpoint, with little or no thought given to how such hardware may be effectively implemented. As a result, the overall cost of the system of FIG. 2 (e.g., $600 or more) places the system outside of the reach of most consumers.

Figure 1:
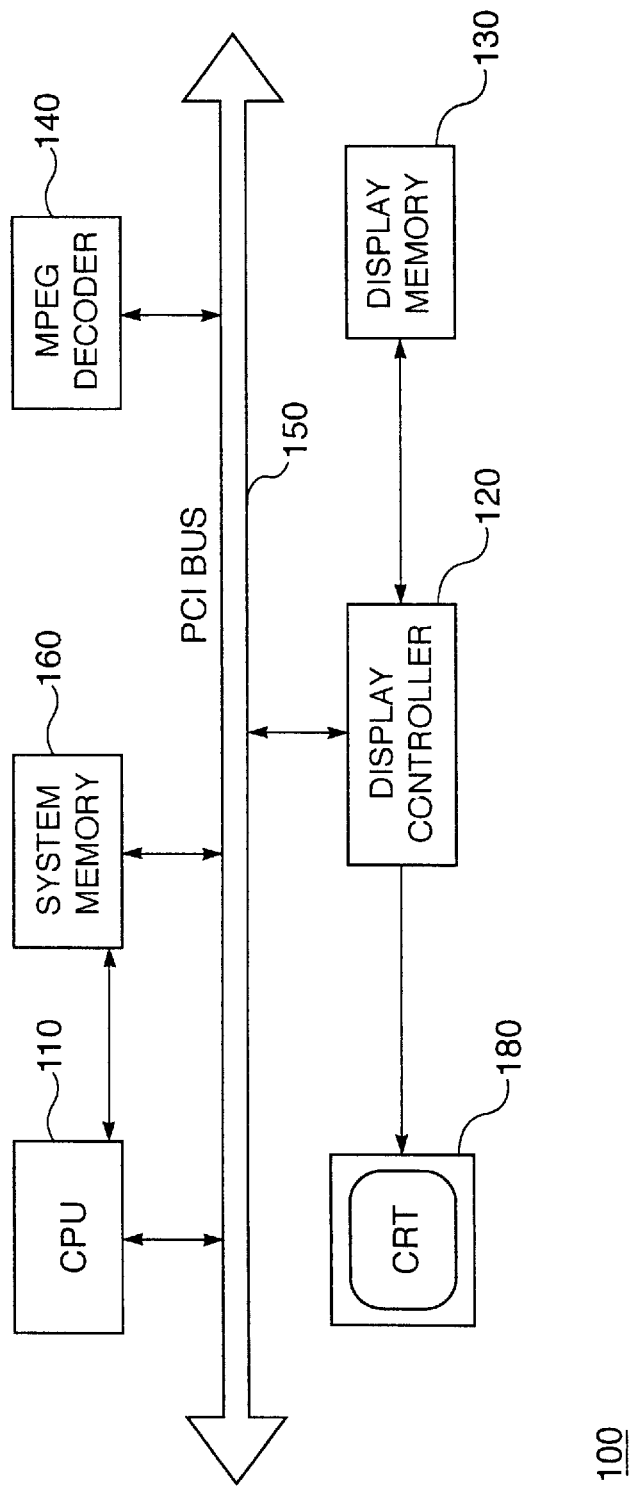
FIG. 1 is a block diagram illustrating major components of a prior art computer system provided with a display controller.
Figure 2:
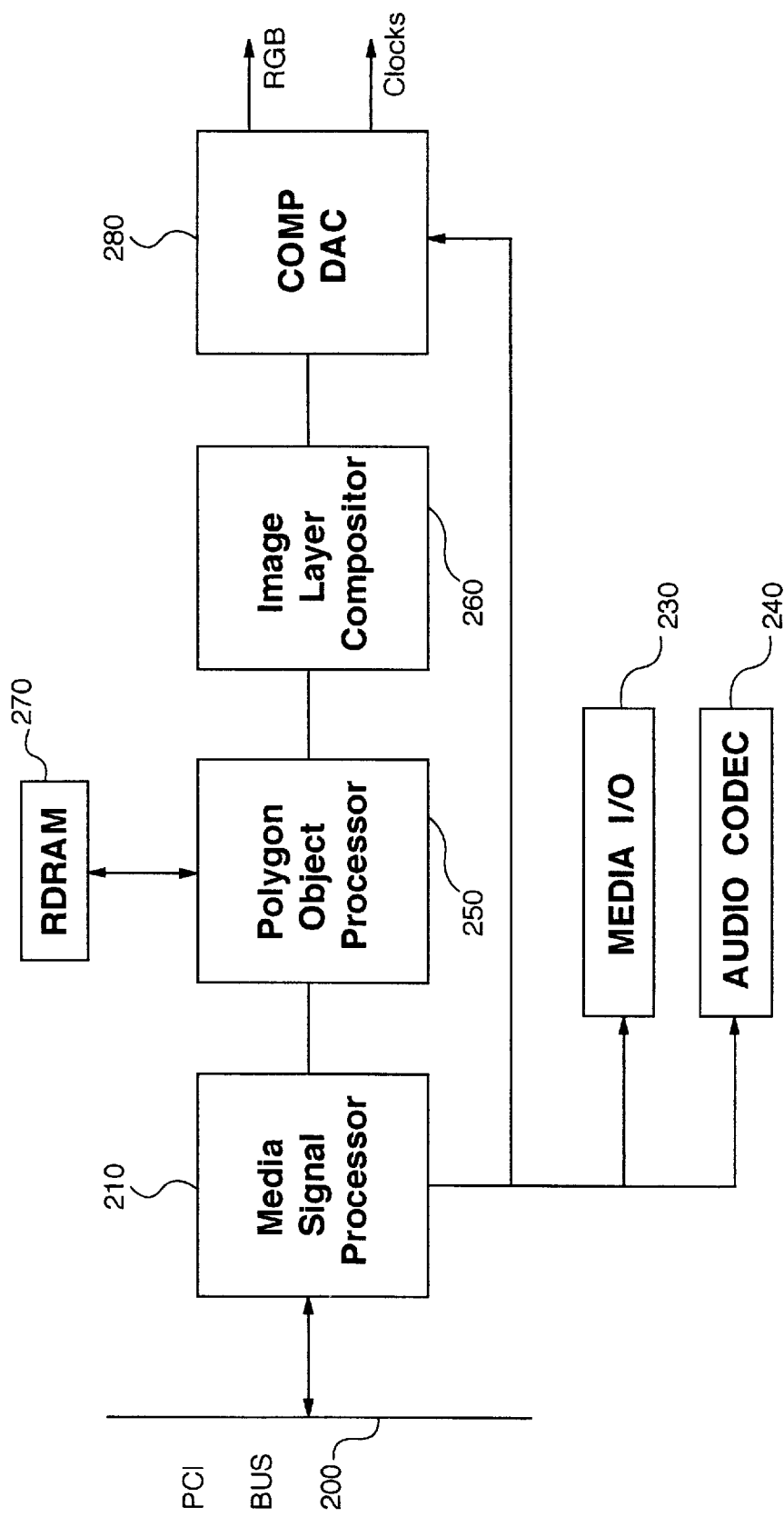
FIG. 2 is a block diagram of a proposed single multi-media device provided as a plug-in card for a PC.
Figure 3:
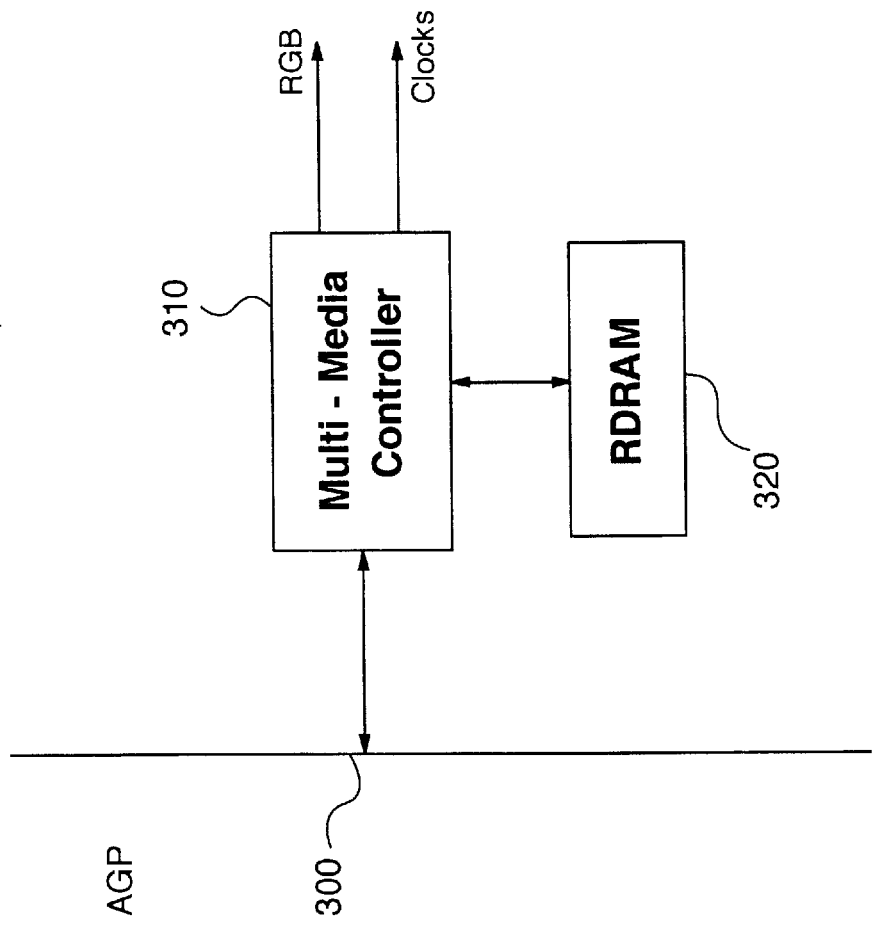
FIG. 3 is a block diagram of another proposed approach to an improved multi-media controller using an Accelerated Graphics Port.
Figure 4:
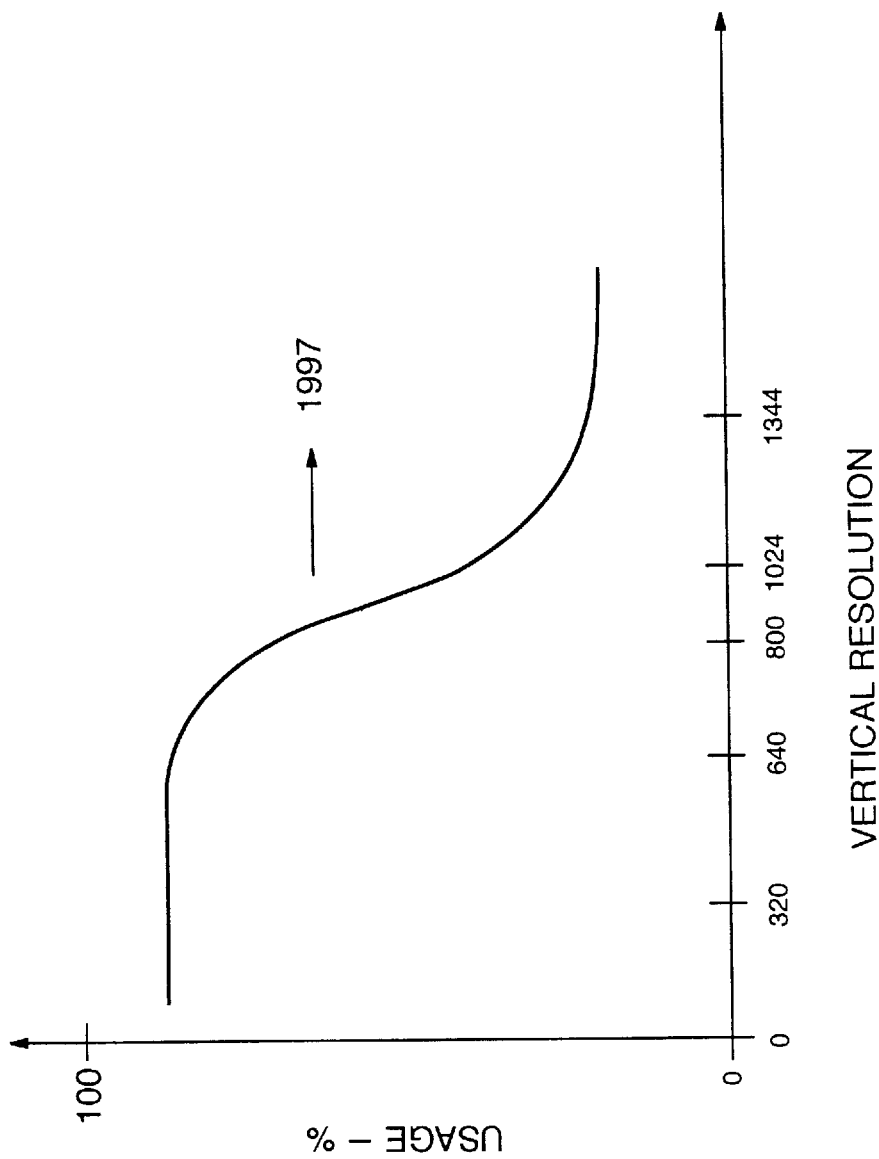
FIG. 4 is a graph illustrating estimated actual usage of various resolution levels along with future trends.

The overall philosophy of the system of FIG. 2 was designed to trade-off accuracy of 3-D rendering for improved perceived performance. In other words, sacrificing the 3-D rendering accuracy of trivial or distant objects to improve the speed of rendering more relevant and close-up objects. The various embodiments of the present invention may trade-off unnecessary performance goals (e.g., for higher resolutions) in return for a more cost-effective implementation. Thus, the present invention provides a complimentary philosophy to the apparatus of FIG. 2.

In a third embodiment of the present invention, band size may be altered on a dynamic basis to provide variable band sizes within a single frame. As noted above, a 3-D image may comprise various layers assembled together to an image layer compositor to produce a resultant image. In many instances, much of an image may comprise a single layer or only a few layers. For example, in a video game, a large portion of the image may comprise background components (sky, walls, and the like) and minor objects (trees, clouds, and the like).

A relatively small portion of the screen may be occupied by a large number of major objects (e.g., opponent, monster, enemy aircraft, or the like). Moreover, such objects may be clustered within one part of the screen (e.g., lower part) such that areas having a high number of layers may be clustered into a relatively small number of bands.

In such a situation, performance improvements may be possible by dynamically altering band size (height) during each frame. For example, upper portions of a screen, having relatively few layers, may be composited in wide bands. as a result, a large portion of the screen image may be composited quickly, leaving extra "time" to composite more complex (e.g., more layers) bands.

Areas having many layers of images may be composited using a smaller (shorter) band size. The additional time left over from compositing the wide bands may now be used to composite a number of narrow bands of highly layered image portions. The use of the dynamically varying band height may allow for slower memories to be used, including the external memory of FIG. 8.

In such a scenario, it is still possible that a band compositor may not be able to keep up in generating a complex, multi-layered image. However, the use of dynamically varying band height may delay the onset of image "crash". Here, image crash does not refer to an error halting processing of a program or image, but rather the introduction of artifacts or improper rendering due to the compositor being unable to keep up with the stream of video data.

Although the present invention has been illustrated and described in detail, it is clearly understood that the same is by way of illustration and example only and is not to be taken by way of limitation, the scope and spirit of the present invention being limited only the terms of the appended claims.

What is claimed is:

1. An apparatus for generating a display image, comprising:
    a display memory for storing image component data;
    an image layer compositor, coupled to the display memory, for receiving image component data and assembling the image component data into a band of display data, said image layer compositor including:
        a compositing buffer having a variable band size configuration, for storing a band of image data, and
        a pixel mapping logic, coupled to the compositing buffer, for receiving line and pixel address data and for translating the line and pixel address data into compositing buffer address data based upon the band size configured for the compositing buffer.

2. The apparatus of claim 1, further comprising:
    an output portion, coupled to the image layer compositor, for receiving pixel data from the image layer compositor and generating a display image from the pixel data.

3. The apparatus of claim 2, wherein said pixel mapping logic further comprises:
    band size data input means for receiving at least two of lines per band data, pixels per line data, and bytes per pixel data;
    first arithmetic logic means, coupled to said band size data input means, for logically combining at least two of lines per band data, pixels per line data, and bytes per pixel data with the line address data to output a first portion of the composite buffer address data; and
    second arithmetic logic means, coupled to said band size data input means, for logically combining at least two of lines per band data, pixels per line data, and bytes per pixel data with the pixel address data to output a second portion of the composite buffer address data.

4. The apparatus of claim 3, wherein said image layer compositor further comprises:
    pixel data receiving means, coupled to said compositing buffer, for receiving a first number of bits of pixel data from the compositing buffer; and
    pixel data output means, coupled to said output portion, for receiving the first number of bits of pixel data from the pixel data receiving means and outputting a second number of bits of pixel data to the output portion.

5. The apparatus of claim 1, wherein the band size configuration of said compositing buffer dynamically altered within a single frame of image data.

6. An apparatus for generating a display image, comprising:
    a display memory for storing image component data, said display memory including a compositing buffer portion having a variable band size configuration;
    an image layer compositor, coupled to the display memory, for receiving image component data and assembling the image component data into a band of display data, said image layer compositor including a pixel mapping logic, coupled to the compositing buffer portion, for receiving line and pixel address data and for translating the line and pixel address data into compositing buffer portion address data based upon the band size configured for the compositing buffer portion.

7. The apparatus of claim 6, further comprising:
    an output portion, coupled to the image layer compositor, for receiving pixel data from the image layer compositor and generating a display image from the pixel data.

8. The apparatus of claim 7, wherein said pixel mapping logic further comprises:
    band size data input means for receiving at least two of lines per band data, pixels per line data, and bytes per pixel data;
    first arithmetic logic means, coupled to said band size data input means, for logically combining at least two of lines per band data, pixels per line data, and bytes per pixel data with the line address data to output a first portion of the composite buffer address data; and
    second arithmetic logic means, coupled to said band size data input means, for logically combining at least two of lines per band data, pixels per line data, and bytes per pixel data with the pixel address data to output a second portion of the composite buffer address data.

9. The apparatus of claim 8, wherein said image layer compositor further comprises:
    pixel data receiving means, coupled to said compositing buffer portion, for receiving a first number of bits of pixel data from the compositing buffer portion; and
    pixel data output means, coupled to said output portion, for receiving the first number of bits of pixel data from the pixel data receiving means and outputting a second number of bits of pixel data to the output portion.

10. The apparatus of claim 6, wherein the band size configuration of said compositing buffer portion dynamically altered within a single frame of image data.

11. A method for generating a display image, comprising the steps of:
    storing, in a display memory, image component data,
    configuring a variable band size compositing buffer with a band size in accordance with image resolution data,
    receiving, in an image layer compositor coupled to the display memory, image component data,
    assembling, in the image layer compositor, the image component data into a band of display data, said step of assembling the image component date including the steps of:
        storing, in the variable band size compositing buffer, a band of image data;
        receiving, in a pixel mapping logic coupled to the variable band size compositing buffer, line and pixel address data; and
        translating, in the pixel mapping logic, the line and pixel address data into compositing buffer address data based upon the band size configured for the variable band size compositing buffer.

12. The method of claim 11, further comprising the steps of:
    receiving, in an output portion, coupled to the image layer compositor, pixel data from the image layer compositor, and
    generating, from the output portion, a display image from the pixel data.

13. The method of claim 12, wherein said assembling step further comprises the steps of:

receiving at least two of lines per band data, pixels per line data, and bytes per pixel data, logically combining at least two of lines per band data, pixels per line data, and bytes per pixel data with the line address data to output a first portion of the composite buffer address data, and logically combining at least two of lines per band data, pixels per line data, and bytes per pixel data with the pixel address data to output a second portion of the composite buffer address data.

14. The method of claim 13, wherein said assembling step further comprises the steps of:

receiving a first number of bits of pixel data from the compositing buffer, and outputting a second number of bits of pixel data to the output portion.

15. The method of claim 11, wherein the band size configuration of said compositing buffer dynamically altered within a single frame of image data.

16. An method for generating a display image, comprising the steps of:

storing, in a display memory, image component data, said display memory including a variable band size compositing buffer portion having a variable band size configuration, configuring the variable band size compositing buffer portion with a band size in accordance with image resolution data, receiving, in an image layer compositor coupled to the display memory, image component data, assembling, in the image layer compositor, the image component data into a band of display data, said step of assembling the image component date including the steps of:

storing, in the variable band size compositing buffer portion, a band of image data;

receiving, in a pixel mapping logic coupled to the variable band size compositing buffer portion, line and pixel address data; and translating, in the pixel mapping logic, the line and pixel address data into compositing buffer portion address data based upon the band size configured for the variable band size compositing buffer portion.

17. The method of claim 16, further comprising the steps of:

receiving, in an output portion, coupled to the image layer compositor, pixel data from the image layer compositor, and generating, from the output portion, a display image from the pixel data.

18. The method of claim 17, wherein said assembling step further comprises the steps of:

receiving at least two of lines per band data, pixels per line data, and bytes per pixel data, logically combining at least two of lines per band data, pixels per line data, and bytes per pixel data with the line address data to output a first portion of the composite buffer portion address data, and logically combining at least two of lines per band data, pixels per line data, and bytes per pixel data with the pixel address data to output a second portion of the composite buffer portion address data.

19. The method of claim 18, wherein said assembling step further comprises the steps of:

receiving a first number of bits of pixel data from the compositing buffer portion; and outputting a second number of bits of pixel data to the output portion.

20. The method of claim 16, wherein the band size configuration of said compositing buffer portion dynamically altered within a single frame of image data.

* * * * *